May 19, 1925. 1,538,340
W. LA HODNY
WINDSHIELD MIRROR BRACKET
Filed Aug. 11, 1923
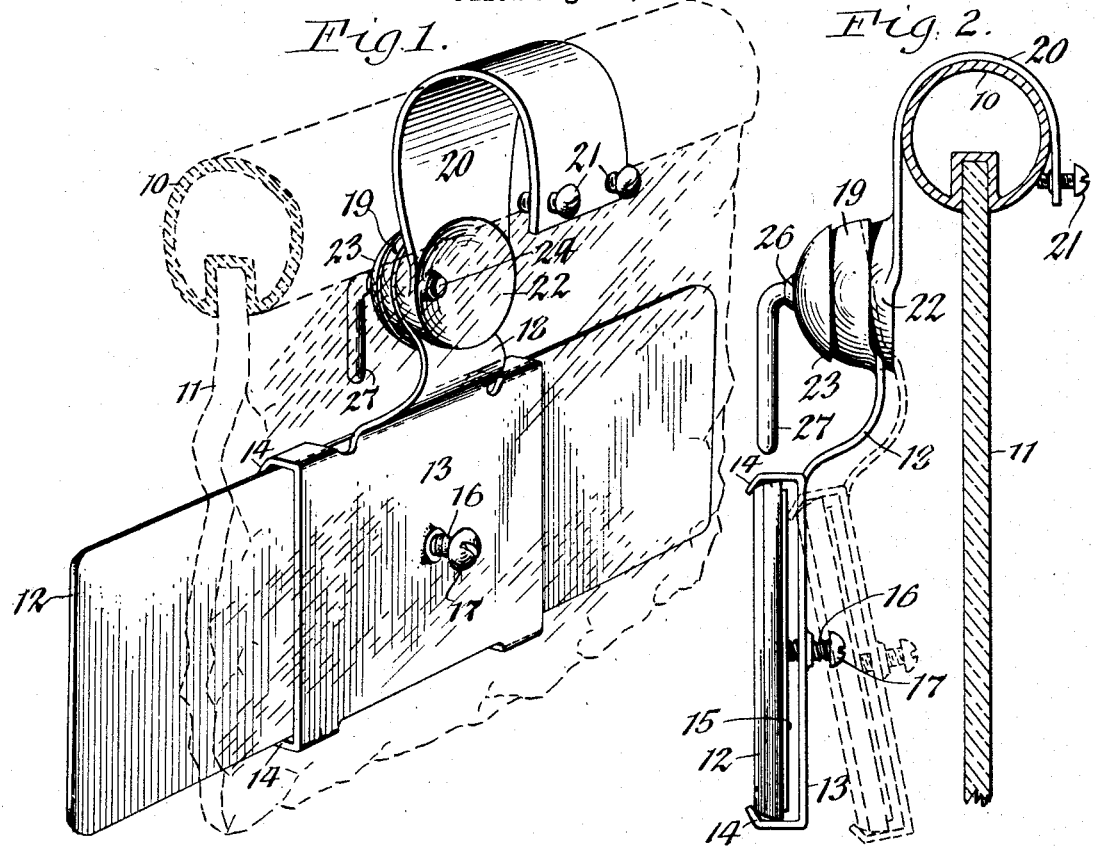
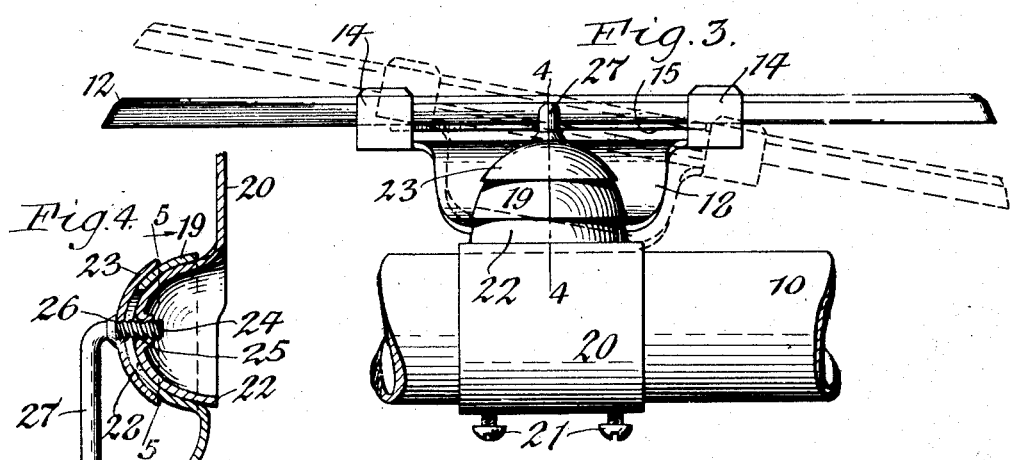
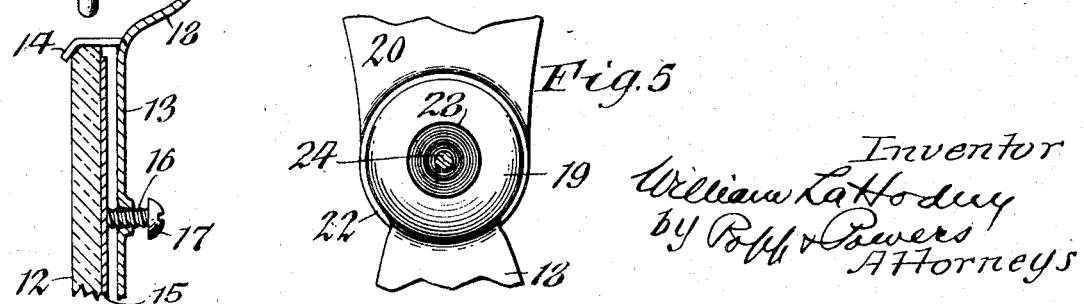

Patented May 19, 1925.

1,538,340

UNITED STATES PATENT OFFICE.

WILLIAM LA HODNY, OF BUFFALO, NEW YORK.

WINDSHIELD-MIRROR BRACKET.

Application filed August 11, 1923. Serial No. 656,964.

*To all whom it may concern:*

Be it known that I, WILLIAM LA HODNY, a citizen of the United States, residing in Buffalo, in the county of Erie and State of New York, have invented new and useful Improvements in Windshield-Mirror Brackets, of which the following is a specification.

This invention relates to a bracket which is more particularly designed for supporting mirrors on the wind shields of automobiles although the same may also be used to advantage where similar conditions exist.

It is the object of this invention to provide a bracket of this character which consists of comparatively few parts, which is composed principally of sheet metal elements capable of being stamped, which can be readily applied to automobiles and the like and easily adjusted so as to cause the mirror to stand at different angles, and which will securely hold the mirror in place after adjustment.

In the accompanying drawings:

Figure 1 is a perspective view from the rear of the bracket showing the same supporting a mirror on a wind shield. Figure 2 is an end view of the same showing the same mounted on a wind shield which latter is represented in section. Figure 3 is a top plan view of the same. Figure 4 is a fragmentary vertical cross section taken on line 4—4, Figure 3. Figure 5 is a fragmentary vertical section taken on the correspondingly numbered line in Figure 4.

Similar characters of reference refer to like parts in the several figures.

The wind shield which is shown in the drawings as one of various fixtures upon which my improved mirror bracket is adapted to be mounted comprises an upper horizontal bar 10 forming part of the frame of the wind shield, and an upright pane of glass 11 mounted on this frame. As an example of one form of mirror suitable for use in connection with my improved bracket, the drawings show a mirror 12 which is of oblong form with its length arranged horizontally and its width vertically.

My improved bracket which is adapted to support this mirror on the frame of the wind shield is constructed as follows;

The numeral 13 represents a supporting plate arranged in an upright position in rear of the mirror and provided at its upper and lower edges with forwardly projecting hooks 14 which are adapted to overhang the upper and lower edges of the mirror, so as to embrace the latter. Between the rear side of this mirror and the front side of the supporting plate is arranged a presser plate 15 which is adapted to be pressed against the rear side of the mirror for holding the latter firmly in place on the supporting plate by means of a screw 16 working with its thread in an opening in the central part of the supporting plate 13 and bearing with its front end against the rear side of the presser plate 15, while its head 17 is accessible from the rear side of the supporting plate for tightening or loosening the same whenever this is required for either adjusting the mirror on the supporting plate or removing the same in case it is broken and replacement of the same is necessary.

Projecting upwardly from the upper edge of the supporting plate 13 is an arm 18 which terminates at its upper end in a hollow spherical head 19, the concave side of which faces rearwardly and the convex side forwardly. This arm together with the supporting plate 13, hook 14 and head 19 are preferably constructed from a single sheet of suitable metal in any well-known manner.

On the wind shield frame is mounted a base section which comprises an attaching flange 20 of hook-shaped form adapted to engage over the upper side of the upper horizontal bar 10 of the wind shield frame and to be detachably secured thereto by means of screws 21 arranged on the rear arm of this hook and engaging with the lower part of the bar 10. On the lower end of the front arm of the hook-shaped flange 20, the same is provided with a forwardly projecting boss 22, which is constructed in the form of a hollow sphere, the convex side of which faces forwardly and the concave side rearwardly. This boss 22 and its attaching flange or hook 20 are also preferably stamped integrally of sheet metal.

The concave side of the head 19 engages with the convex side of the boss 22 and is capable of turning thereon in all directions in the manner of a ball and socket joint, so that the mirror 12 which is operatively connected therewith may be adjusted to any desired angle, within certain limits, relatively to the plane of the wind shield. The head 19 may be tightly drawn against the boss 22 for the purpose of holding the mirror in its adjusted position by any approved means, those shown in the drawings being satisfactory and consisting of a concavo-convex clamping disk 23 bearing with its concave side against the front convex side of the head 19, and a clamping screw 24 passing through the summit of the head 19 and engaging the rear part of its thread with a threaded opening 25 in the summit of the boss 22 and provided at its front end with a shoulder 26 bearing against the front side of the disk 23 and also with a handle or finger piece 27 whereby the screw may be manipulated for tightening or loosening the same. The opening 28 in the head 19 through which the screw 24 passes is considerably larger in diameter than the screw, so as to permit the head 19 to be turned in all directions on the boss 22 for adjusting the angularity of the mirror as best suits the requirements.

This bracket as a whole is exceedingly simple in construction and, the same is composed of comparatively few parts each of which can be produced at relatively low cost.

The same can be readily assembled and also easily mounted on wind shields of standard construction, and when in use the same lies very close to the wind shield and is not liable to become displaced by the vibrations of the car.

I claim as my invention:

A bracket for supporting a mirror on a windshield comprising a supporting plate upon the front side of which the mirror is adapted to be mounted and which is provided at its upper edge with an upwardly projecting bracket which is integral with the plate and terminates at its upper end in an integral concavo-convex head having its concave side facing rearwardly, a hanger constructed of an integral sheet of metal and having its upper part forming a hook, the mouth of which opens downwardly and is adapted to engage over the upper edge of a windshield and its lower part forming a concavo-convex head the convex side of which faces forwardly and engages the concave rear side of the head on said supporting plate, and means frictionally and pivotally connecting said heads.

WILLIAM LA HODNY.